United States Patent
Huss et al.

(10) Patent No.: US 6,211,237 B1
(45) Date of Patent: Apr. 3, 2001

(54) AQUEOUS DISINFECTING AGENT CONTAINING PERFORMIC ACID AND PERACETIC ACID PROCESS FOR PRODUCTION AND PROCESS FOR USE THEREOF

(75) Inventors: Michael Huss, Eschborn; Roland Schneider, Hasselroth; Andrea Preuss, Hanau; Rainer Fuchs, Mömbris/Hohl, all of (DE)

(73) Assignee: Degussa-Huls AG, Frankfurt am Main (DE)

( * ) Notice: Subject to any disclaimer, the term of this patent is extended or adjusted under 35 U.S.C. 154(b) by 0 days.

(21) Appl. No.: 09/274,342

(22) Filed: Mar. 23, 1999

(30) Foreign Application Priority Data

Mar. 23, 1998 (DE) .............................................. 198 12 589

(51) Int. Cl.⁷ ............................. A01N 37/00; A01N 37/08
(52) U.S. Cl. ............................................ 514/557; 514/572
(58) Field of Search ...................................... 514/557, 572

(56) References Cited

FOREIGN PATENT DOCUMENTS

| 0 231 632 A2 | 8/1987 | (EP) . |
| 63-277644 | * 11/1988 | (JP) . |
| 9827941 | * 7/1998 | (JP) . |
| 94/21122 | 9/1994 | (WO) . |
| WO 94/20424 | 9/1994 | (WO) . |
| WO 95/24388 | 9/1995 | (WO) . |
| WO 95/32625 | 12/1995 | (WO) . |

* cited by examiner

Primary Examiner—S. Mark Clardy
Assistant Examiner—Alton Pryor
(74) Attorney, Agent, or Firm—Pillsbury Madison & Sutro LLP

(57) ABSTRACT

Disinfecting agents according to the invention with a high microbiocidal effect contain up to 5 wt. % performic acid, hydrogen peroxide and peracetic acid. The agents can be obtained by addition of a source of formic acid such as formic acid, a water-soluble salt of the same or a lower formic ester, to an aqueous phase containing 5 to 50 wt. % hydrogen peroxide and 1 to 15 wt. % peracetic acid and, in the case of the addition of a salt, additionally a mineral acid. Preferred agents result from the addition of 0.1 to 1 mole sodium formate or formic acid, per kg of the agent to be produced, to an equilibrium peracetic acid containing mineral acid with 0.5 to 6 wt. % peracetic acid.

10 Claims, No Drawings

AQUEOUS DISINFECTING AGENT CONTAINING PERFORMIC ACID AND PERACETIC ACID PROCESS FOR PRODUCTION AND PROCESS FOR USE THEREOF

FIELD OF THE INVENTION

The invention is directed towards an aqueous disinfecting agent containing performic acid and peracetic acid, a process for production thereof and also the use thereof for controlling micro-organisms, particularly in aqueous systems.

For the treatment of aqueous solutions, particularly municipal sewage, surface waters and industrial recirculated waters and waste waters containing micro-organisms, that—for hygienic, operational or environmental reasons—cannot be discharged or re-used in the untreated state, effective treatment processes are necessary. Effective chemical processes that at the same time are environmentally compatible are based on the use of active-oxygen compounds such as disinfecting agents containing, in particular, hydrogen peroxide, peroxyacetic acid and peroxyformic acid, usually designated as peracetic acid and performic acid. The term "disinfecting agent" is to be understood to mean an agent that is suitable for controlling all types of micro-organisms, such as bacteria, viruses, molds and algae; in addition, this agent is suitable for controlling small creatures such as zooplankton.

BACKGROUND OF THE INVENTION

It is known that hydrogen peroxide is a moderately effective, mild disinfecting agent with bacteriostatic properties. Whereas $H_2O_2$ concentrations of 25 mg/l do inhibit the growth of some bacteria, an effective lowering of the bacterial count requires many hours, even at much higher $H_2O_2$ concentrations, or an additional UV irradiation process. Such measures are inadequate and, in addition, not economical for disinfecting large quantities of water, for instance the treatment of water in clarification plants and their outlets.

Peroxyacetic acid (PAA), on the other hand, is a highly effective active agent, the use of which enables a rapid reduction of bacteria. Peracetic acid is employed, inter alia, for sterilization of items used in the food industry and for the disinfection of bottles and in hospitals. Commercially available peracetic acid solutions with a content of 15 wt. % PAA additionally contain about 14 wt. % $H_2O_2$ and 28 wt. % acetic acid. The use of PAA solutions of this type causes, on account of their unpleasant corrosive and fire-accelerating properties, problems with regard to handling, storage, materials and transport. A further disadvantage is the high content of acetic acid, which can result in an increased COD content and, additionally, in a drastic bacterial aftergrowth.

The previously demonstrated disadvantages of the PAA solutions can, according to DE-OS 195 31 241.4, be avoided by using a peracetic acid solution of low concentration with a content of 0.5 to 2.5 wt. % PAA, 40 to 50 wt. % hydrogen peroxide and less than 2 wt. % acetic acid. Despite the acknowledged good effect of such a peracetic acid solution as a disinfecting agent, in some applications there is a demand for a more rapid and, in some cases, a still more efficiently active disinfecting agent based on active-oxygen compounds that does not present the disadvantages of the aforementioned PAA solutions with a PAA content of 15 wt. % or above.

An alternative to disinfecting agents based on solutions containing peracetic acid and hydrogen peroxide is constituted by aqueous solutions that contain performic acid (PFA), PAA, hydrogen peroxide and formic acid. According to J. Hyg. Epidem. Microbiol. Immunol. (1968) 12, 115, performic acid possibly exhibits better fungicidal properties than peracetic acid, but the effect might also be attributed to formic acid. By using a solution of this type it is possible, according to EP 0 231 632 A2, for micro-organisms on surfaces and, according to WO 94/20424, in water circuits to be controlled or destroyed within about 0.5 to 60 minutes at a usage concentration in the range from 1 to 1,000 ppm, in particular 5 to 100 ppm, of performic acid.

The PFA solution according to WO 94/20424 and EP 0 231 632 is produced in situ by reaction of hydrogen peroxide with formic acid, the molar ratio of $H_2O_2$ to formic acid lying in the range from 1:10 to 10:1. Highly concentrated formic acid and 20 to 50 wt. % hydrogen peroxide are employed. Disadvantages of such a PFA solution are the not inconsiderable risk of explosion and the high corrosivity and hence problems as regards handling and safety.

From WO 95/24388 it is known that the reaction of formic acid with hydrogen peroxide proceeds fairly slowly until equilibrium is established, but the formation of PFA can be accelerated in the presence of a carboxylic ester, for example ethyl acetate, by way of catalyst. In addition to a carboxylic ester or as an alternative thereto, a compound with a —C(O)—O— group— which, however, is not a carboxylic group—may serve as catalyst; in this document, however, there is no suggestion as to why it might be a question of compounds of this type.

A disinfecting agent containing performic acid is also known from WO 95/32625: the performic acid is formed by reaction of a formic ester such as ethyl formate with an oxidant, in particular hydrogen peroxide. Although the diminished corrosivity in comparison with the formic-acid/hydrogen-peroxide system is advantageous, the very low concentration of performic acid as demonstrated by the Examples—as a result of which an adequate rate of kill can only be achieved after a relatively long exposure time—is disadvantageous. In addition, a formic ester is more expensive than formic acid.

In DE-A 39 29 335 a process is taught for the disinfection of textiles in washing installations, whereby an agent containing peroxycarboxylic acid is admixed in the final rinsing operation. This agent is, in particular, an equilibrium peroxycarboxylic acid solution with a content of 40 to 60 wt. % carboxylic acid, 2 to 5 wt. % peroxycarboxylic acid and 0.1 to 3 wt. % hydrogen peroxide. With a view to producing the agent, in addition to acetic acid use may also be made of formic acid and propionic acid, as well as mixtures of such acids, by way of carboxylic acid; no details can be gathered from this document relating to two carboxylic acids and, accordingly, agents containing the corresponding peroxycarboxylic acids.

Although disinfecting agents based on performic acid may in some cases display a higher microbiocidal effect than those based on peracetic acid, the production and handling of solutions containing performic acid in higher concentration is problematic.

SUMMARY OF THE INVENTION

Accordingly, the object of the invention is to demonstrate a disinfecting agent containing performic acid, peracetic acid and hydrogen peroxide that can be produced easily and safely in situ and that can be used for disinfecting purposes after a short reaction time. In addition, the disinfecting agent should result, after a short exposure time, in a high rate of kill of the micro-organisms in aqueous systems.

A process has been found for producing an aqueous disinfecting agent containing peracetic acid and performic acid by addition of a source of formic acid to an aqueous phase containing hydrogen peroxide, said process being characterised in that use is made, by way of source of formic acid, of formic acid or a water-soluble salt of formic acid in a quantity from 0.1 to 1.0 mole formic acid or 0.1 to 1.0 equivalent of formate per kg of the disinfecting agent to be produced and, by way of aqueous phase containing hydrogen peroxide, of an equilibrium peracetic acid solution with a content of 20 to 60 wt. % hydrogen peroxide, 0.5 to 6 wt. % peracetic acid, less than 10 wt. %, in particular less than 2 wt. %, acetic acid and of up to 3 wt. % of a mineral acid, and the mixture is allowed to stand for at least 1 minute to 5 hours prior to use.

By way of aqueous phase containing hydrogen peroxide and peracetic acid an equilibrium peracetic acid is preferably employed which, owing to the equilibrium, also contains acetic acid. In addition, the equilibrium peracetic acid expediently also contains a mineral acid catalyst stemming from its production, such as, in particular, a catalyst of this type selected from the series comprising sulfuric acid, phosphoric acid ($H_3PO_4$), pyrophosphoric acid ($H_4P_2O_7$) and polyphosphoric acid ($H_{n+2}P_nO_{3n+1}$), where n is an integer $\geq 3$. The peracetic acid solution expediently contains 0.1 to 5 wt. %, in particular 0.5 to 3 wt. %, mineral acid.

The content of peracetic acid (PAA) in the equilibrium peracetic acid to be employed expediently lies in the range from 0.5 to 15 wt. %, in particular 0.5 to 6 wt. % and, according to another preferred embodiment, in the range from about 1 to 3 wt. %. Such equilibrium peracetic acid solutions generally have a content of hydrogen peroxide in the range from about 20 to 60 wt. %, in particular 20 to 50 wt. %; preferred solutions with 1 to 3 wt. % peracetic acid usually contain 30 to 50 wt. % hydrogen peroxide. The acetic acid content of preferred equilibrium peracetic acid solutions should, as a rule, lie below 10 wt. %. Solutions with 0.5 to 3 wt. % PAA preferably contain less than 2 wt. % and, particularly preferred, less than 1 wt. % acetic acid. An acetic acid content that is as low as possible reduces the risk of rapid bacterial aftergrowth after microbiocidal treatment of an aqueous system with a disinfecting agent that has been produced in accordance with the invention. Accordingly, in a preferred embodiment an equilibrium peracetic acid with a content of 30 to 50 wt. % $H_2O_2$, 1 to 3 wt. % peracetic acid (PAA), less than 2 wt. %, in particular less than 1 wt. %, acetic acid and 0.5 to 3 wt. % mineral acid is employed by way of aqueous phase.

By way of source of formic acid, either formic acid, a lower formic ester, such as methyl, ethyl or propyl formate, or a water-soluble salt of formic acid can be employed. The salt may be added in the solid state or in the form of an aqueous solution of the aqueous phase containing $H_2O_2$ and PAA. Water-soluble salts are alkali-metal formates, in particular sodium formate, and alkaline-earth-metal formates, in particular calcium formate. Also employable are ammonium formate and quaternary ammonium formates, whereby the quaternary ammonium ion, for instance ($C_{10}$–$C_{18}$)-alkyltrimethylammonium, may itself exhibit microbiocidal properties. The particular advantage of the use of an alkali-metal formate lies in the safe and easy handling thereof, the lack of odor of the salt and also in the reduction in the corrosivity of the disinfecting agent to be produced.

The quantity of formic acid or salt of formic acid that is used lies ordinarily in the range from 0.1 to 1 mole formic acid or 0.1 to 1 equivalent of formate per kg of the disinfecting agent to be produced. Provided that the peracetic acid solution employed contains a sufficiently large quantity of mineral acid, the quantity used can also be increased further, even in the case where use is made of formates. In the case where a salt of formic acid is employed, the quantity used should be lower than is required for neutralisation of the mineral acid that is present. Preferably 0.1 to 0.8 m-equivalent of alkali-metal formate, in particular sodium formate, are employed per m-equivalent of mineral acid that is present.

With a view to producing a preferred disinfecting agent, one of the aforementioned preferred equilibrium peracetic acid solutions with a PAA content of 0.5 to 6 wt. %, an $H_2O_2$ content of 20 to 50 wt. % and an acetic acid content of less than 10 wt. % is brought into contact with 0.2 to 1 mole formic acid or 0.2 to 1 equivalent of formate by way of source of formic acid. After being left to stand or being stirred for a short time, in general for at least 1 minute to 5 hours, the solution now containing performic acid (PFA), peracetic acid (PAA) and hydrogen peroxide can be used as a disinfecting agent. The attainment of equilibrium is frequently not necessary, because non-reacted formic acid itself exhibits microbiocidal activity. The solution containing PFA should preferably be used within about 12 hours, since the PFA content declines again after attaining a maximal value and the peracid content substantially drops again to values pertaining to the solution originally employed.

A preferred aqueous disinfecting agent that can be obtained with the process according to the invention contains per kg: 0.1 to 3 wt. % performic acid, 0.1 to 5 wt. % peracetic acid, formic acid and acetic acid in a total quantity of less than 10 wt. % and 20 to 50 wt. % hydrogen peroxide.

In addition, the disinfecting agent may contain conventional additives, including active-oxygen stabilisers such as complexing agents selected from the group comprising the phosphonic acid compounds, tin compounds and pyridinecarboxylic acids or salts thereof or radical scavengers, furthermore corrosion inhibitors, hardness stabilisers, scale-preventing agents and surfactants, in particular anionic and non-ionic surfactants. Furthermore, microbiocides selected from classes of substances other than active-oxygen compounds may additionally be present.

The disinfecting agents that can be obtained in accordance with the invention are distinguished by their high effectiveness in controlling micro-organisms from the group comprising bacteria, viruses, molds and algae. Already within 30 seconds of addition of the disinfecting agent to an aqueous system the micro-organismal count [KBE/ml] falls by 3 to 4 powers of ten. Such a high and, in particular, rapid rate of kill is required in the case where a disinfecting agent is employed in swimming-pools, by reason of statutory conditions that are imposed. Obviously a disinfecting agent solution according to the invention containing PFA and PAA, relative to the total content of percarboxylic acid, acts better than a previously conventional solution which contains only PAA by way of percarboxylic acid. As is evident from Example E2 and Comparative Examples CE2 and CE0, with the solution according to the invention a more rapid and more complete reduction in the bacterial count was achieved than with a previously known solution containing only performic acid by way of percarboxylic acid. This was surprising, because the total content of percarboxylic acid in Example 2 amounted only to about 40% of that of Comparative Example 2. Although Example E2 contained more hydrogen peroxide than Comparative Example CE2, it is known that hydrogen peroxide acts bacteriostatically but barely acts bactericidally.

The quantity of the disinfecting agent used conforms to the designated purpose. Ordinarily 1 to 1,000 mg, in particular 1 to 100 mg and, particularly preferred, 5 to 20 mg, of the disinfecting agent are employed per l of the water to be treated.

The process according to the invention can be applied in varying fields. By way of examples, mention may be made of: recirculated water and waste water from the food, brewing and milk industries; recirculated water and waste water of chemical processes in which problems may arise—for instance, formation of slime and odor—without disinfection and/or inhibition of the increase in bacteria; water and slurries derived from petrochemistry as well as municipal clarification plants; swimming-pool water. A further application of the process according to the invention lies in the field of soil decontamination: through addition of the disinfecting agent to the water of an infiltration well, microorganisms in the immediate vicinity of the same are reduced; hence the biological decomposition of the hydrogen peroxide which is present by way of oxygen carrier is diminished and a greater range of non-decomposed hydrogen peroxide in the soil is obtained.

Significant advantages of the process according to the invention are the safe handling of the performic acid and the rapid availability thereof from substances that are easily transported and easily stored. Sodium formate as a source of formic acid is, in comparison with formic acids, easier to transport, storable, odor-free and non-corrosive on the skin.

The disinfecting effect can easily be controlled by adjusting the quantity of the source of formic acid used and the composition of the peracetic acid solution to be employed. A further advantage is the rapid effect of the disinfecting solution and the high rate of germ elimination. Solutions with a very low content of acetic acid are distinguished by delayed bacterial aftergrowth. The disinfecting agent according to the invention is particularly suitable in those cases where excessive acidity is undesirable. The concentration of the performic acid that is formed after production of the agent according to the invention falls off again after a few hours, whereas the effect of the peracetic acid which is present in the agent is largely preserved. The agent is therefore particularly suitable in those cases where an intensified effect is initially needed but, at the same time, a more prolonged microbicidal effect is demanded.

DETAILED DESCRIPTION OF THE PREFERRED EMBODIMENTS

EXAMPLE 1 AND COMPARATIVE EXAMPLE 1

A disinfecting agent according to the invention was produced by addition of 20 g formic acid (FA) to 980 g of an equilibrium peracetic acid that contained 2 wt. % peracetic acid (PAA), 1 wt. % acetic acid (AA) and 48 wt. % hydrogen peroxide as well as 2 wt. % $H_2SO_4$.

After a standing time of only 2 hours this solution was employed as a disinfecting agent in comparison with the equilibrium peracetic acid for the treatment of swimming-pool water; quantity used in each case: 10 mg disinfecting agent per l water.

Pure cultures of the bacterial suspension to be tested were added to a swimming-pool water under standardised conditions, and a concentration of $10^7$ to $10^8$ KBE/ml was adjusted. After addition of the disinfecting agent, samples were taken following an exposure time of either 10, 20 or 30 seconds and, after inactivation of the disinfecting agent, the residual concentration of the test bacteria was determined in these samples and the disinfecting capacity ($KR_t$) was ascertained from this concentration.

$$KR_t = \log KBE_{(KO)} - \log KBE_{(D)},$$

where $KBE_{(KO)}$ is the number of KBE per ml without action of a disinfecting agent and $KBE_{(D)}$ is that after action.

|  | Example 1 | Comparative Example 1 |
|---|---|---|
| Rate of germ elimination | 22–30 seconds | more than 60 seconds |
| Pseudomonas aeruginosa ATCI 15442 | 4 log orders | 4 log orders |
| Escherichia coli ATCI 11229 | 3 log orders | 3 log orders |

The disinfecting capacity demanded in accordance with DIN 19643 and in accordance with the recommendation of the BGA (German Federal Health Authority) is therefore attained. A further advantage is that the use of PAA alone would result in an excessive COD and would not achieve the rapid rate of germ elimination of the invention. PFA alone, on the other hand, would not achieve the requirements as regards standing time. Only the combination of the two reagents ensures satisfaction of the aforementioned requirements.

EXAMPLE 2 E2) AND COMPARATIVE EXAMPLE 2 (CE2)

The biological effectiveness of a disinfecting agent solution (E2) according to the invention containing peracetic acid and performic acid was investigated in comparison with a solution (CE2) containing exclusively performic acid by way of percarboxylic acid. The composition of the solutions is evident from the Table:

|  | E2 | CE 2 |
|---|---|---|
| Production | Mix a peracetic acid solution (= CE 0) containing 2 wt. % PAA, 48 wt. % $H_2O_2$, 1 wt. % AA and 2 wt. % $H_2SO_4$ with 3 wt. % HCOOH (FA); allow to stand for 4 h | Mix 68 g of a 35 wt. % $H_2O_2$ solution with 32 g formic acid (FA); allow to stand for 4 h |
| Composition (in wt. %) |  |  |
| PFA | 1.55 | 8.0 |
| PAA | 1.90 | — |
| FA | 1.85 | 27.1 |
| AA | 1.0 | — |
| $H_2O_2$ | 45.1 | 19.6 |

The progression of the bacterial count of *E. coli* K12 was investigated with a dose of 50 ppm of the solution according to E2, 50 ppm of the solution according to CE2 and 50 ppm of the peracetic acid solution (=CE0) employed for production of the solution according to E2. The effect was ascertained by means of a quick test of bioluminescence.

The progression of the values for the luminescence (RLU value)—a measure of the decrease in the bacterial count—is evident from the Table:

| RLU after minutes | E 2 | CE 2 | CE 0 |
|---|---|---|---|
| 5 | 320 | 270 | 950 |
| 10 | 40 | 160 | 560 |
| 15 | 25 | 150 | — |
| 30 | 0 | 50 | 110 |

By employing the disinfecting agent according to the invention the RLU value fell in 30 minutes to 0 (=E2), whereas by employing the previously known performic acid solution (=CE2) a final value of 50 was attained and by employing the peracetic acid solution (=CE0) employed for producing E2 a final value of 110 was attained.

EXAMPLES 3 AND 4

The formation of performic acid was investigated after addition of 1 wt. % formic acid (=E3) or 1 wt. % sodium formate (Nafo) (=E4) to an equilibrium peracetic acid (E-PAA 2) with a content of 2 wt. % PAA, 1 wt. % AA, 2 wt. % $H_2SO_4$ and 48 wt. % $H_2O_2$; furthermore, the stability of the active-oxygen content (% AO) resulting from percarboxylic acids was investigated.

The Table shows the results—% AO from peracids as a function of time.

Table:

| time (h) | for comparison E-PAA 2 | E 3 E-PAA 2 +1% FA | E 4 E-PAA 2 +1% Nafo |
|---|---|---|---|
| 0 | 0.42 | | |
| 1 | | | 0.45 |
| 3 | | 0.52 | |
| 4 | | | 0.48 |
| 5 | | 0.62 | |
| 6 | | | 0.50 |
| 7 | | | 0.47 |
| 65 | 0.42 | 0.50 | 0.43 |

As a result of adding formic acid or sodium formate the content of percarboxylic acid rises. The rate of formation using sodium formate is lower, since as a result of this a portion of the catalytically active sulfuric acid is neutralised; for the same reason the stability is lower. An improved buffering is achieved.

EXAMPLES 5 AND 6

Analogously to Examples 3 and 4, a 5 wt. % equilibrium peracetic acid solution (E-PAA 5) (5% PAA, 7% M, 23% $H_2O_2$ and 2% $H_2SO_4$) was mixed with 1 wt. % formic acid (FA) (relative to the E-PAA) or 1 wt. % sodium formate (Nafo). The Table shows the formation and AO stability as a function of time.

Table:

| Time (h) | for comparison E-PAA 5 | E 5 E-PAA 5 +1% FA | E 6 E-PAA 5 +1% Nafo |
|---|---|---|---|
| 0 | 1.05 | | |
| 4 | | 1.15 | |
| 6 | | 1.13 | 1.13 |
| 8 | | | 1.05 |
| 65 | 1.05 | 1.07 | 1.03 |

What is claimed is:

1. A process for producing an aqueous disinfecting agent containing peracetic acid and performic acid comprising:
   adding a source of formic acid to an aqueous phase containing hydrogen to form a mixture peroxide;
   wherein the source of formic acid comprises a member selected from the group consisting of formic acid and a water-soluble salt of formic acid in a quantity from 0.1 to 1.0 mole formic acid or 0.1 to 1.0 equivalent of formate per kg of the disinfecting agent to be produced,
   wherein the aqueous phase containing hydrogen peroxide comprises an equilibrium peracetic acid solution with a content of 20 to 60 wt. % hydrogen peroxide, 0.5 to 6 wt. % peracetic acid, less than 10 wt. % acetic acid and up to 3 wt. % of a mineral acid, and
   allowing the mixture to stand for at least 1 minute to 5 hours prior to use such that the aqueous disinfecting agent achieves an effective disinfecting capacity ($KR_t$) satisfying the equation $$KR_t = \log KBE_{(KO)} - \log KBE_{(D)}$$

within 30 seconds of contacting micro-organisms, wherein $KBE_{(KO)}$ is the number of micro-organisms per ml of sample in the absence of a disinfecting agent and $KBE_{(D)}$ is the number of micro-organisms per ml of sample after exposure to the aqueous disinfecting agent.

2. A process according to claim 1, wherein the amount of acetic acid is less than 2 wt. %.

3. A process according to claim 1, wherein the source of formic acid comprises an alkali metal formate, and 0.1 to 0.8 m-equivalent of said formate is added per m-equivalent of mineral acid that is present.

4. A process according to claim 3, wherein the alkali metal formate comprises sodium formate.

5. A process according to claim 1, wherein the mineral acid of the equilibrium peracetic acid solution is selected from the group consisting of sulfuric acid, phosphoric acid, pyrophosphoric acid and polyphosphoric acid.

6. An aqueous disinfecting agent, comprising:
   0.1 to 3 wt. % performic acid, 0.1 to 5 wt. % peracetic acid,
   formic acid and acetic acid in a total quantity of up to 10 wt. %,
   hydrogen peroxide in a quantity from 20 to 50 wt. %, and
   a mineral acid in a quantity of up to 3 wt. %,
   wherein the aqueous disinfecting agent achieves an effective disinfecting capacity ($KR_t$) satisfying the equation $$KR_t = \log KBE_{(KO)} - \log KBE_{(D)}$$

within 30 seconds of contacting micro-organisms, wherein $KBE_{(KO)}$ is the number of micro-organisms per ml of sample in the absence of a disinfecting agent and $KBE_{(D)}$ is the number of micro-organisms per ml of sample after exposure to the aqueous disinfecting agent.

7. An aqueous disinfecting agent according to claim 6, wherein the formic acid and acetic acid is present in an amount of less than 2 wt. %.

8. An aqueous disinfecting agent according to claim 6, further comprising:

up to 1 wt. % sodium ions derived from sodium formate employed in producing the agent.

9. A process for using the aqueous disinfecting agent according to claim 6 comprising adding the aqueous disinfecting agent to aqueous systems or on surfaces for controlling micro-organisms selected from the group comprising bacteria, viruses, molds and algae.

10. A process according to claim 9, comprising adding the agent to swimming-pool water for disinfecting the water.

* * * * *